United States Patent
Eo et al.

(10) Patent No.: US 9,175,757 B2
(45) Date of Patent: Nov. 3, 2015

(54) AUTOMATED MANUAL TRANSMISSION FOR VEHICLE

(71) Applicant: Hyundai Motor Company, Seoul (KR)

(72) Inventors: Soon Ki Eo, Ansan-si (KR); Jong Yun Park, Hwaseong-si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 211 days.

(21) Appl. No.: 13/687,399

(22) Filed: Nov. 28, 2012

(65) Prior Publication Data

US 2013/0331226 A1   Dec. 12, 2013

(30) Foreign Application Priority Data

Jun. 12, 2012  (KR) .......................... 10-2012-0062421

(51) Int. Cl.
 *F16H 37/02* (2006.01)
 *F16H 15/14* (2006.01)
 *F16H 15/40* (2006.01)
 *F16H 61/04* (2006.01)

(52) U.S. Cl.
 CPC .............. *F16H 15/14* (2013.01); *F16H 37/021* (2013.01); *F16H 61/04* (2013.01); *F16H 15/40* (2013.01); *F16H 2061/0425* (2013.01)

(58) Field of Classification Search
 CPC ..................................................... F16H 37/021
 USPC ....................................... 74/325, 333; 476/54
 See application file for complete search history.

(56) References Cited

U.S. PATENT DOCUMENTS

| | | | |
|---|---|---|---|
| 1,844,239 A | | 2/1932 | Boehme et al. |
| 2,611,038 A | | 9/1952 | Graham |
| 2,835,134 A | * | 5/1958 | Perruca .......................... 476/63 |
| 3,010,330 A | * | 11/1961 | Perruca .......................... 476/48 |
| 4,099,683 A | | 7/1978 | Stouffer et al. |
| 4,226,135 A | | 10/1980 | Winter |
| 5,311,789 A | | 5/1994 | Henzler et al. |
| 5,613,401 A | | 3/1997 | Maurizio |
| 7,258,032 B2 | | 8/2007 | Kim |

(Continued)

FOREIGN PATENT DOCUMENTS

| | | | |
|---|---|---|---|
| DE | 42 34 629 | * | 4/1993 |
| EP | 0 071 801 | * | 2/1983 |

(Continued)

OTHER PUBLICATIONS

Automated Manual Transmission, pp. 87-94.

*Primary Examiner* — William C Joyce
(74) *Attorney, Agent, or Firm* — Morgan, Lewis & Bockius LLP

(57) ABSTRACT

An automated manual transmission for a vehicle may include a shifting section between an input shaft and an output shaft, and a continuously variable power transfer unit disposed between the output shaft and the power providing device, wherein the continuously variable power transfer unit includes, a driving circular plate engaged to the power providing device, a driven circular plate engaged to the output shaft of the shifting section and arranged in parallel to the driving circular plate, the driven circular plate being rotatable around a first rotation shaft spaced in parallel from a second rotation shaft of the driving circular plate, a driving member disposed between the driven circular plate and the driving circular plate and a driving member adjustment device selectively moving the driving member.

12 Claims, 11 Drawing Sheets

(56) References Cited

U.S. PATENT DOCUMENTS

| | | |
|---|---|---|
| 7,513,851 B2 | 4/2009 | Sieffert et al. |
| 8,042,418 B2 | 10/2011 | Matsushita et al. |
| 8,220,352 B2 | 7/2012 | Ross et al. |
| 8,360,919 B2 | 1/2013 | Kraynev et al. |
| 8,696,505 B2 | 4/2014 | Lee et al. |
| 2002/0033059 A1 | 3/2002 | Pels et al. |
| 2011/0017015 A1 | 1/2011 | Cimatti et al. |
| 2011/0203409 A1 | 8/2011 | Nishida et al. |

FOREIGN PATENT DOCUMENTS

| | | | |
|---|---|---|---|
| JP | 63-163062 | * | 7/1988 |
| JP | 2003-106389 | A | 4/2003 |
| JP | 2005-195115 | A | 7/2005 |
| KR | 2003-0031896 | A | 4/2003 |
| KR | 10-0951967 | B1 | 12/2009 |
| KR | 10-2010-0042964 | A | 4/2010 |
| KR | 10-2011-0001326 | A | 1/2011 |
| KR | 10-2011-0021120 | A | 3/2011 |

* cited by examiner

AUTOMATED MANUAL TRANSMISSION FOR VEHICLE

CROSS-REFERENCE TO RELATED APPLICATION

The present application claims priority to Korean Patent Application No. 10-2012-0062421, filed on Jun. 12, 2012, the entire contents of which is incorporated herein for all purposes by this reference.

BACKGROUND OF THE INVENTION

1. Field of the Invention

The present disclosure relates to an automated manual transmission. More particularly, it relates to a configuration of the automated manual transmission which makes it possible to improve non-smooth shifting, such as pulling, when shifting.

2. Description of Related Art

The gears of automated manual transmissions are automatically changed by an actuator while a vehicle travels so that they can provide convenience similar to automatic transmissions and contribute to improving fuel efficiency of a vehicle with power transmission efficiency better than automatic transmissions.

However, for an automated manual transmission based on a synchro-mesh type of shifting mechanism, power is necessarily instantaneously block even during shifting that is automatically performed by an actuator and as a result produced torque decreases and thus the non-smooth shifting, as if a vehicle is pulled back, is generated.

The description provided above as a related art of the present invention is just for helping understanding the background of the present invention and should not be construed as being included in the related art known by those skilled in the art.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing an automated manual transmission is provided that can improve the commercial value of a vehicle by preventing non-smooth shifting to achieve smooth and stable shifting response, by transferring a separate power to a driving wheel during a shifting while using a conventional shifting mechanism in which power is blocked instantaneously necessarily and connected.

In an aspect of the present invention, an automated manual transmission for a vehicle may include a shifting section provided with a plurality of shifting units for implementing different gear ratio between an input shaft and an output shaft, and a continuously variable power transfer unit for transferring a power from a power providing device to the output shaft at a continuously variable gear ratio, wherein the continuously variable power transfer unit is disposed between the output shaft and the power providing device, wherein the continuously variable power transfer unit may include a driving circular plate that is engaged to the power providing device, a driven circular plate that is engaged to the output shaft of the shifting section and is arranged in parallel to the driving circular plate, the driven circular plate being rotatable around a first rotation shaft spaced in parallel from a second rotation shaft of the driving circular plate, a driving member disposed between the driven circular plate and the driving circular plate and arranged such that a contact radius of the driving member with the driving circular plate and a contact radius of the driving member with the driven circular plate are increased-decreased mutually simultaneously by a movement thereof along a common radial direction of the driving circular plate and the driven circular plate, and a driving member adjustment device selectively moving the driving member.

The automated manual transmission may further include a driving side cylinder being connected to the driving circular plate and compressing the driving circular plate toward the driving member or separating the driving circular plate from the driving member, and a transfer gear being connected integrally to the driven circular plate through the first rotation shaft and transferring a rotation force of the driven circular plate to the output shaft.

The automated manual transmission may further include a support circular plate arranged rotatably and coaxially with the driving circular plate, in opposite direction to the driving circular plate with respect to the driven circular plate, wherein the driving member is arranged between the support circular plate and the driven circular plate such that a contact radius of the driving member with the support circular plate and a contact radius of the driving member with the driven circular plate are increased-decreased mutually and simultaneously by a movement thereof along a common radial direction of the support circular plate and the driven circular plate, and a support side cylinder being connected to the support circular plate and compressing the support circular plate toward the driving member or separating the support circular plate from the driving member.

The driving circular plate is coaxially connected via the second rotation axis to the driven gear that is meshed with a driving gear connected to a third rotation shaft of the power providing device, wherein a plurality of driven circular plates are arranged with respect to the driving circular plate, and wherein a plurality of transferring gears are connected to each of the driven circular plates respectively and are together meshed with an output driven gear of the output shaft.

Driving member adjustment devices are arranged doubly in parallel with each other between the driving circular plate and the driven circular plate.

In another aspect of the present invention, a plurality of driving circular plates are provided respectively with a media gear engaged with the driven gear, wherein the driven circular plate is provided commonly to the driving circular plates, and wherein the transferring gear connected to the driven circular plate is meshed with an output driven gear of the output shaft.

The driving member may include a reference control plate having a radial guide groove, wherein the radial guide groove is formed from a rotation center of the reference control plate in a radial direction thereof so that the driving member is inserted in the radial guide groove for a radial movement of the driving member to be guided therealong, and an inclination control plate having an inclination guide groove, wherein the inclination control plate is formed to be slanted with respect to a radial direction from a rotation center of the inclination control plate, wherein the reference control plate and the inclination control plate are coaxially arranged at the rotation centers of the reference control plate and the inclination control plate with the driving circular plate to be rotated relatively, and wherein the driving member is inserted in the radial guide groove and the inclination guide groove for a movement thereof to be guided.

A clutch for providing intermittently power from the power providing device to the input shaft is provided between the input shaft and the power providing device.

The power providing device is an engine of an internal combustion engine, wherein the clutch may include a clutch disk that is configured to be in contact with a fly wheel of the engine, and wherein the driving circular plate is connected to a clutch cover which surrounds an outer part of the clutch disk, the driving circular plate being formed with a hollow shaft through which the input shaft passes, and receives power therefrom.

The shifting mechanism of the shifting section is synchronized and meshed by using a key and a synchronizer.

The shifting mechanism of the shifting section is configured by a dog clutch.

In further another aspect of the present invention, an automated manual transmission may include a shifting section provided with a plurality of shifting units for implementing different gear ratio between an input shaft and an output shaft, and a continuously variable power transfer unit for transferring a power from a power providing device to the output shaft at a continuously variable gear ratio, wherein the continuously variable power transfer unit is disposed between the output shaft and the power providing device, wherein the continuously variable power transfer unit may include a driving circular plate that is engaged to the power providing device, a driven circular plate that is arranged in parallel to the driving circular plate, the driven circular plate being rotatable around a first rotation shaft spaced in parallel from a second rotation shaft of the driving circular plate, a support circular plate that is arranged coaxially with the driving circular plate and the output shaft and is connected to the output shaft, a driving member disposed between the driven circular plate and the driving circular plate and arranged such that a contact radius thereof with the driving circular plate and a contact radius thereof with the driven circular plate are increased-decreased mutually simultaneously by a movement thereof along a common radial direction of the driving circular plate and the driven circular plate, a driving member adjustment device selectively moving the driving member, and a support side cylinder being connected to the support circular plate and compressing the support circular plate toward the driving member or separating the support circular plate from the driving member.

In another aspect of the present invention, the driving member adjustment devices may include a reference control plate having a radial guide groove, wherein the radial guide groove is formed from a rotation center of the reference control plate in a radial direction thereof so that the driving member is inserted in the radial guide groove for a radial movement of the driving member to be guided therealong, and an inclination control plate having an inclination guide groove, wherein the inclination control plate is formed to be slanted with respect to a radial direction from a rotation center of the inclination control plate, wherein the reference control plate and the inclination control plate are coaxially arranged at the rotation centers of the reference control plate and the inclination control plate with the driving circular plate to be rotated relatively, and wherein the driving member is inserted in the radial guide groove and the inclination guide groove for a movement thereof to be guided.

The driving member adjustment devices are arranged doubly in parallel with each other between the driving circular plate and the driven circular plate.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
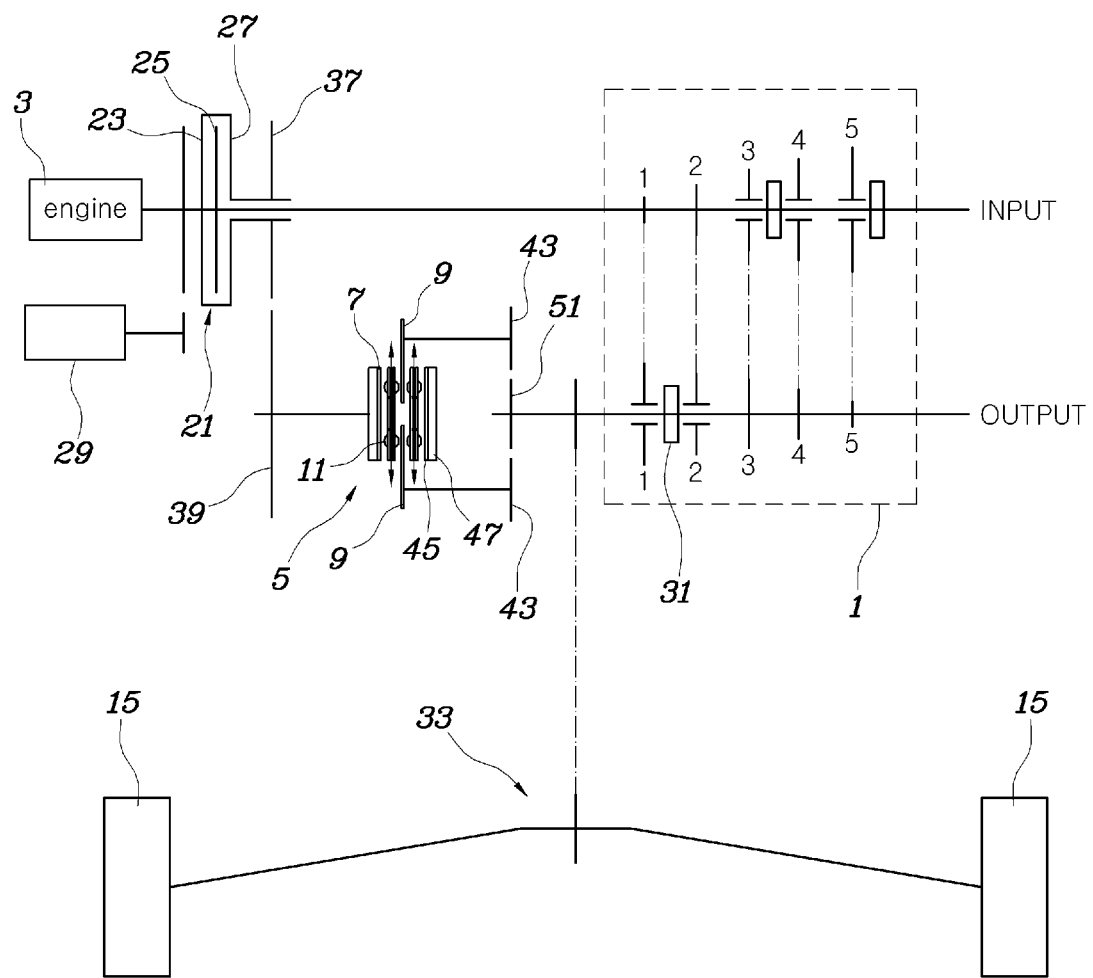
FIG. 1 is a view showing a structure of an automated manual transmission according to an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Referring to FIG. 1, an automated manual transmission according to an exemplary embodiment of the present invention includes: a shifting section 1 provided with a plurality of shifting units for implementing different gear ratio between an input shaft and an output shaft, and a continuously variable power transfer unit 5 for transferring the power from a power providing device 3 to the output shaft at a continuously variable gear ratio, which is disposed between the power providing device 3 for providing the power to the input shaft of the shifting section 1 and the output shaft.

That is, with respect to the shifting section 1 having a conventional manual transmission shifting mechanism, power is transferred in series from the power providing device 3 to the continuously variable power transfer unit 5 and is provided to the output shaft continuously so as to be a roundabout way to the input shaft when the shifting section 1 is shifted, thereby preventing the torque decrease due to blocked power during a shifting.

In an exemplary embodiment of the present invention, the continuously variable power transfer device 5 may include: a driving circular plate 7 connected to a rotation shaft of the power providing device 3, a driven circular plate 9 that is rotated through a rotation shaft spaced in parallel from a rotation shaft of the driving circular plate 7 and is arranged in parallel to the driving circular plate 7 and is connected to the output shaft, a driving member 11 that is arranged such that its contact radius with the driving circular plate 7 and its contact radius with the driven circular plate 9 are increased-decreased mutually simultaneously by its movement to common radial direction of the driving circular plate 7 and the driven circular plate 9 between the driving circular plate 7 and the driven circular plate 9, and a driving member adjustment device 13 for moving the driving member 11.

Figure 2:
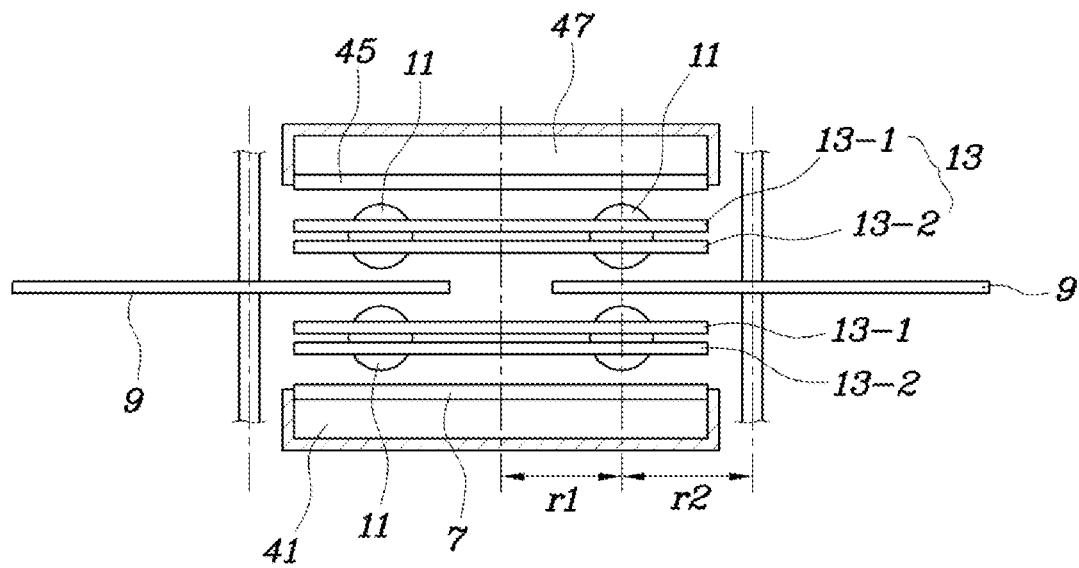
FIG. 2 is a view showing a continuously variable power transfer unit in FIG. 1.
Figure 3:
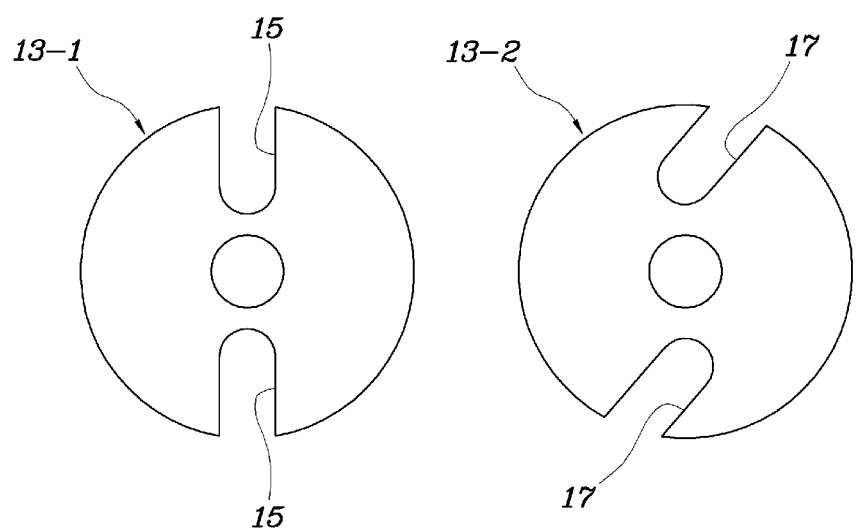
FIG. 3 is a view showing a comparison between a reference control plate and an inclination control plate in FIG. 2.
Figure 4:
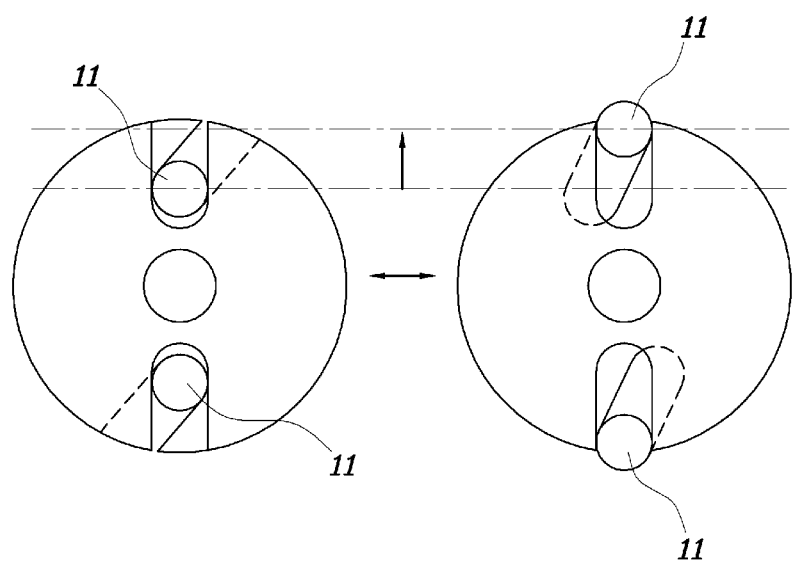
FIG. 4 is a view showing a movement principle of a driving member by a relative rotation of the reference control plate and the inclination control plate in FIG. 3.

As shown in FIGS. 2 to 4, the driving member adjustment devices 13 are arranged doubly in parallel with each other between the driving circular plate 7 and the driven circular plate 9 and further includes a reference control plate 13-1 and an inclination control plate 13-2 which are coaxially arranged with the driving circular plate 7 to be rotated relatively. Here, a radial guide groove 15 is provided in the reference control plate 13-1 such that it is formed from a rotation center of the reference control plate to a radial direction so that the driving member 11 is inserted therein for its radial movement to be guided, and further an inclination guide groove 17 is provided in the inclination control plate 13-2 such that it is formed slantly with respect to a radial direction from a rotation center so that the driving member 11 is inserted therein for its movement to be guided, and a part of the inclination guide groove is always communicated with the radial guide groove 15.

Accordingly, when the inclination control plate 13-2 is rotated relatively with respect to the reference control plate 13-1 by using an actuator such as a known motor, as shown in FIG. 4, the driving member 11 is moved eventually to a radial direction while a communication part between the radial guide groove 15 and the inclination guide groove 17 varies, and the contact radius r1 from a center of the driving circular plate 7 to a contact point with the driving member 11 and the contact radius r1 from a center of the driven circular plate 9 to a contact point with the driving member 11 are varied continuously by the radial movement of the driving member 11, and as a result the power is transferred at continuously variable gear ratio from the driving circular plate 7 to the driven circular plate 9 through the driving member 11.

Meanwhile, a clutch 21 for providing intermittently power from the power providing device 3 to the input shaft may be provided between the input shaft and the power providing device 3.

In the present embodiment, the power providing device 3 may be an engine of an internal combustion engine and further the clutch 21 may include a clutch disk 25 that is to be in contact with a fly wheel 23 of the engine, and further the driving circular plate 7 may be connected to a clutch cover 27 which surrounds the outer part of the clutch disk 25 and in which a hollow shaft through which the input shaft passes is formed, and receive power therefrom.

That is, the clutch disk 25 and the fly wheel 23 are arranged in the same manner as the conventional clutch mechanism, but in the present embodiment, there is difference in that the clutch cover 27 serves as a hollow rotation shaft for transferring rotation force to the driving circular plate 7 from an engine. Through this configuration, a compact power train configuration is possible while using in maximum the conventional manual transmission clutch mechanism.

In more detail, a driving gear 37 is connected integrally to the clutch cover 27 and a driven gear 39 is meshed with the driving gear 37 so that power from the driven gear 39 is transferred to the driving circular plate 7.

Meanwhile, a driving side cylinder 41 for compressing the driving circular plate 7 toward the driving member 11 or separating the driving circular plate from the driving member is connected to the driving circular plate 7 and further a transfer gear 43 for transferring a rotation force from the driven circular plate 9 to the output shaft is connected integrally to the driven circular plate 9.

Further, in the exemplary embodiment as shown in FIG. 1, a support circular plate 45 is arranged rotatably and coaxially with the driving circular plate 7, corresponding to the driving circular plate 7, in opposite direction to the driving circular plate 7 based on the driven circular plate 9, the driving member 11 is arranged between the support circular plate 45 and the driven circular plate 9 such that its contact radius with the support circular plate 45 and its contact radius with the driven circular plate 9 are increased-decreased mutually and simultaneously by its movement to a common radial direction of the support circular plate 45 and the driven circular plate 9, and a support side cylinder 47 for compressing the support circular plate 45 toward the driving member 11 or separating the support circular plate from the driving member is connected to the support circular plate 45.

Accordingly, the driving side cylinder 41 and the support side cylinder 47 are link-moved to a mutually faced-direction for the driving member 11 to be compressed with respect to the driven circular plate 9 in a middle part thereof, or separated from the driven circular plate, incapable of power being transferred, thereby converting power transferring states.

Further, the driving circular plate 7 is connected coaxially to the driven gear 39 that is meshed with the driving gear 37 connected to a rotation shaft of the power providing device 3, a plurality of the driven circular plates 9 are arranged with respect to one driving circular plate 7 and further the transferring gears 43 which are connected to the respective driven circular plate 9 are together meshed with an output driven gear 51 of the output shaft.

Figure 10:
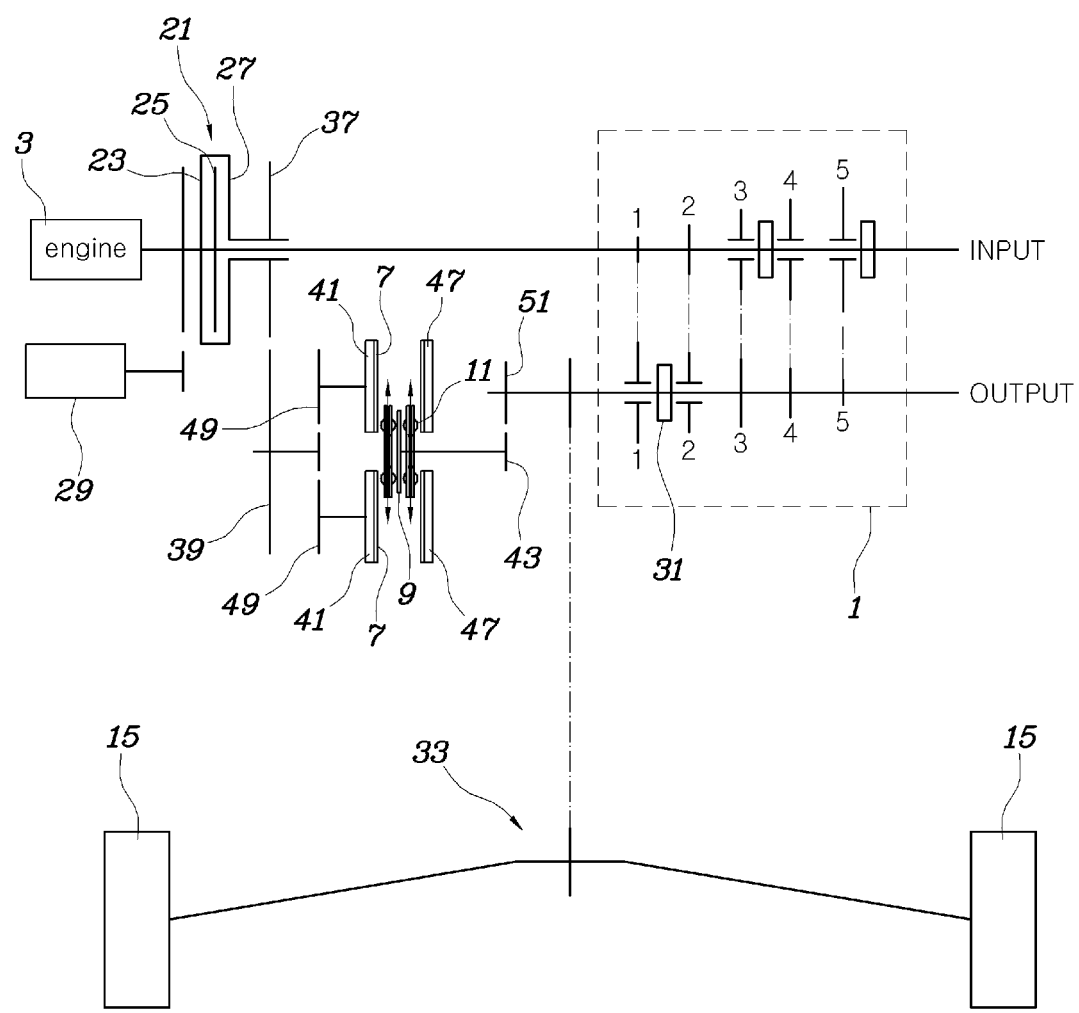
FIGS. 10 and 11 are views showing another embodiment of the present invention, respectively.

In comparison to this configuration, in the exemplary embodiment shown in FIG. 10, other configurations are identical to them shown in FIG. 1, but, there is difference in that a combination of the driving side cylinder 41 and the support side cylinder 47 is arranged as plural in series and thus the driving circular plate 7 is provided as plural, the respective driving circular plate 7 is provided with a media gear 49 to which power is transferred from the driven gear 39 that is meshed with the driving gear 37 connected to a rotation shaft of the power providing device 3, the driven circular plate 9 is provided commonly to the plural driving circular plate 7, and the transferring gear 43 of the driven circular plate 9 is meshed with the output driven gear 51 of the output shaft.

Figure 11:
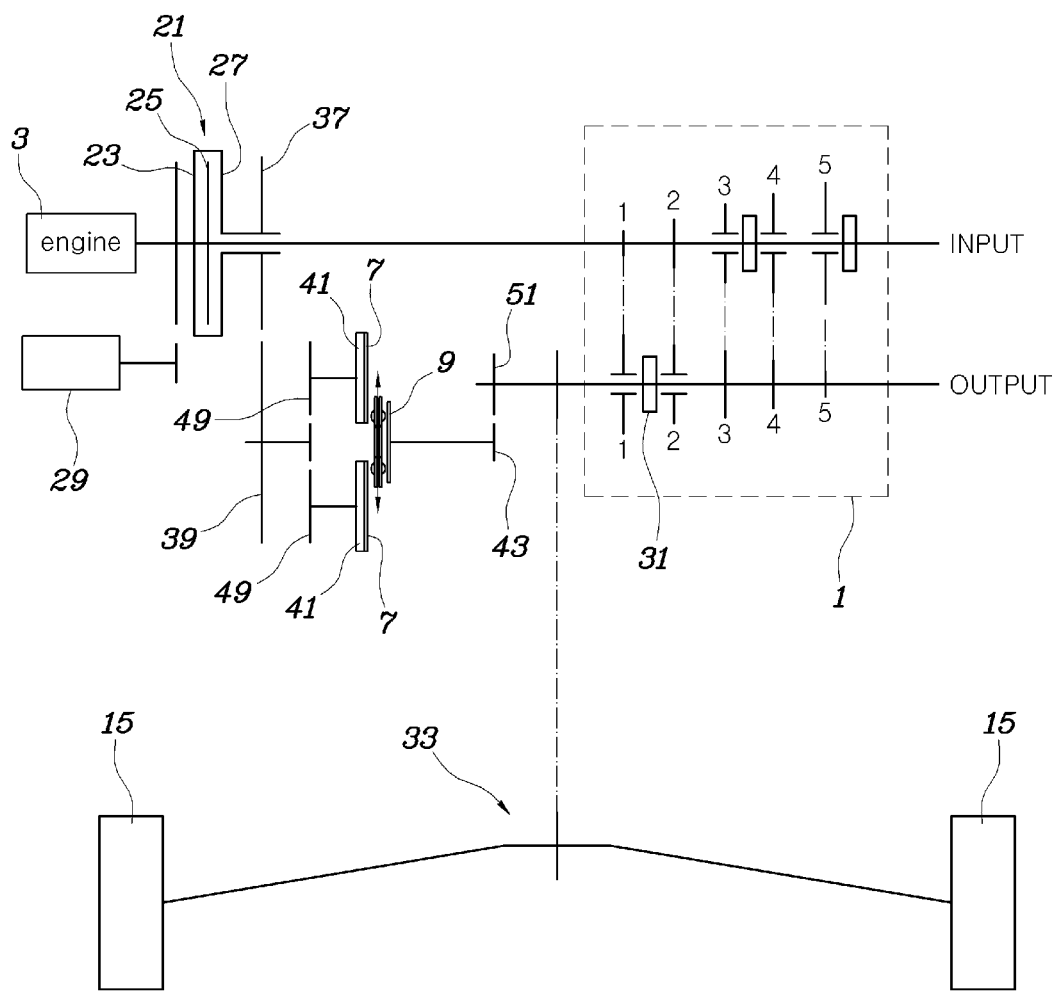

Additionally, referring to the exemplary embodiment shown in FIG. 11, unlike the exemplary embodiment as shown in FIG. 1 or 10, the driving side cylinder 41 for compressing the driving circular plate 7 with respect to the driving member 11 or separating the driving circular plate from the driving member is connected to the driving circular plate 7, the transferring gear 43 for transferring a rotation force of the driven circular plate 9 to the output shaft is connected integrally to the driven circular plate 9 wherein the driving circular plate is provided as plural, the respective driving circular plate 7 is provided with the media gear 49 to which power is transferred from the driven gear 30 that is meshed with the driving gear 37 connected to a rotation shaft of the power providing device 3, one driven circular plate 9 is provided commonly to the plural driving circular plates 7, and the transferring gear 43 of the driven circular plate 9 is meshed with the driven gear 39 of the output shaft. Therefore, in the configuration as shown in FIG. 10, the support circular plate 45 and the support side cylinder 47 are omitted, and power is to be transferred to the output shaft only through one driven circular plate 9 and the transferring gear 43.

Figure 12:
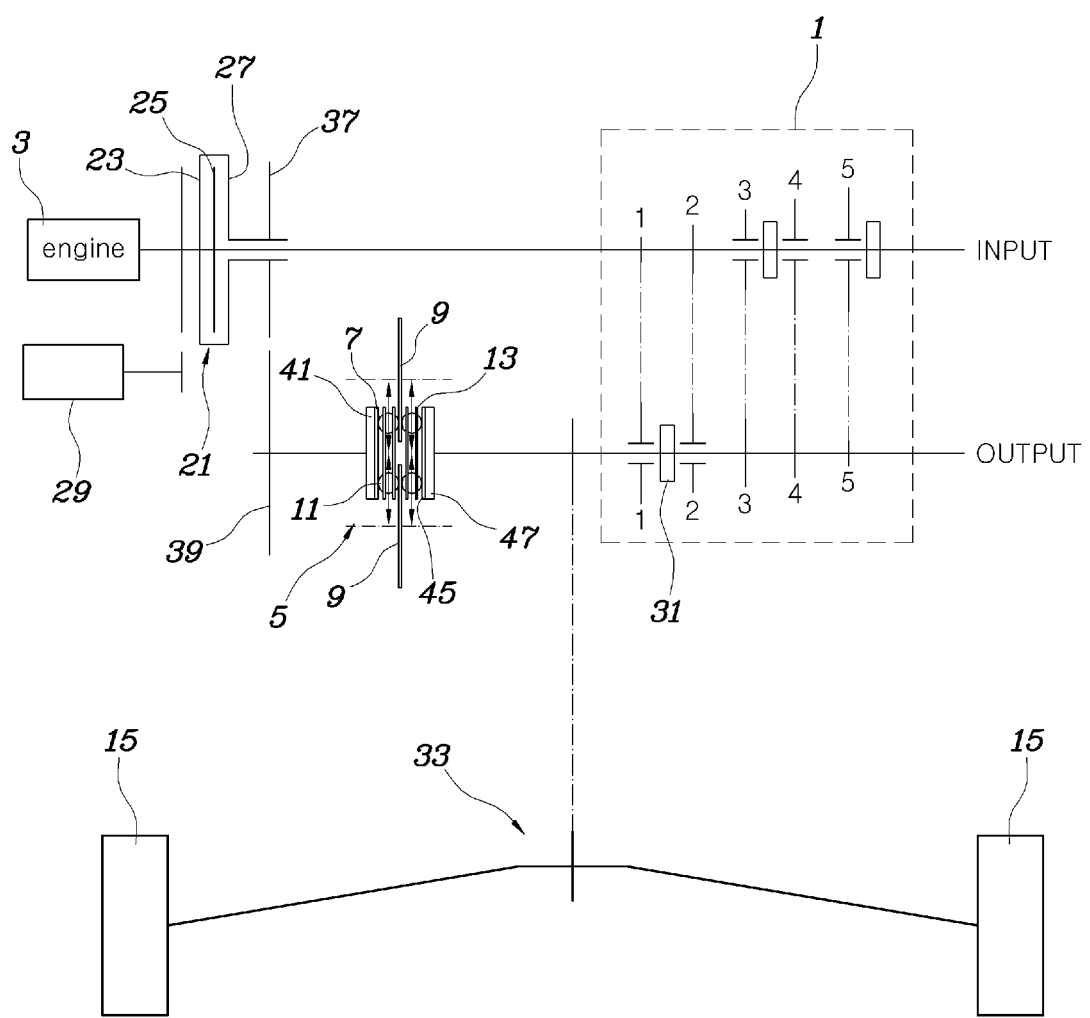
FIG. 12 is a view showing still another embodiment of the present invention.

Further, in the exemplary embodiment as shown in FIG. 12, unlike the exemplary embodiments as shown in FIGS. 1, 10 and 11, the output shaft is connected directly through the support circular plate 45 and the support side cylinder 47 and thus the power from the driving circular plate 7 is shifted between it and the driven circular plate 9 and between it and the support circular plate 45 depending on a movement of the driving member 11 and is transferred to the output shaft through the support circular plate 45 and the support side cylinder 47 wherein the support side cylinder 47 is separated from the support circular plate 45 to intermit power, as shown in FIG. 12.

Meanwhile, in the exemplary embodiments of the present invention, the shifting mechanism of the shifting section 1 is configured in synchro-mesh way in which gears are synchronized and then meshed using a key and a synchronizer ring, however, in addition to this configuration, the shifting mechanism of the shifting section 1 may be configured by using other mechanism such as a dog clutch, etc.

Hereinafter, operations of the exemplary embodiments as shown in FIGS. 1 to 9 will be described, but detailed descriptions of the operation of the exemplary embodiments as shown in FIGS. 10-12 are omitted since they are operated in almost same way.

Figure 7:
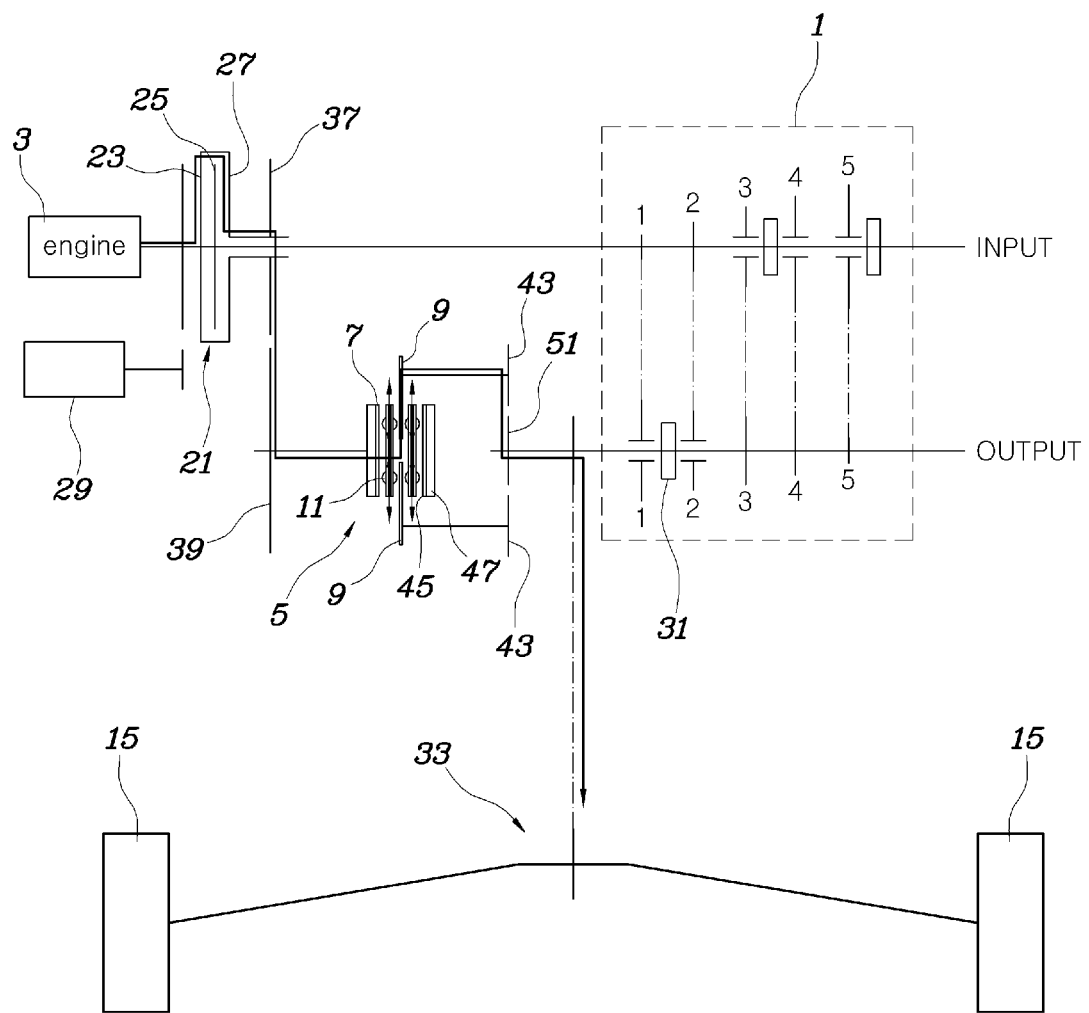
FIG. 7 is a view showing a power transference relation while a first stage is shifted to a second stage in the structure shown in FIG. 1.
Figure 8:
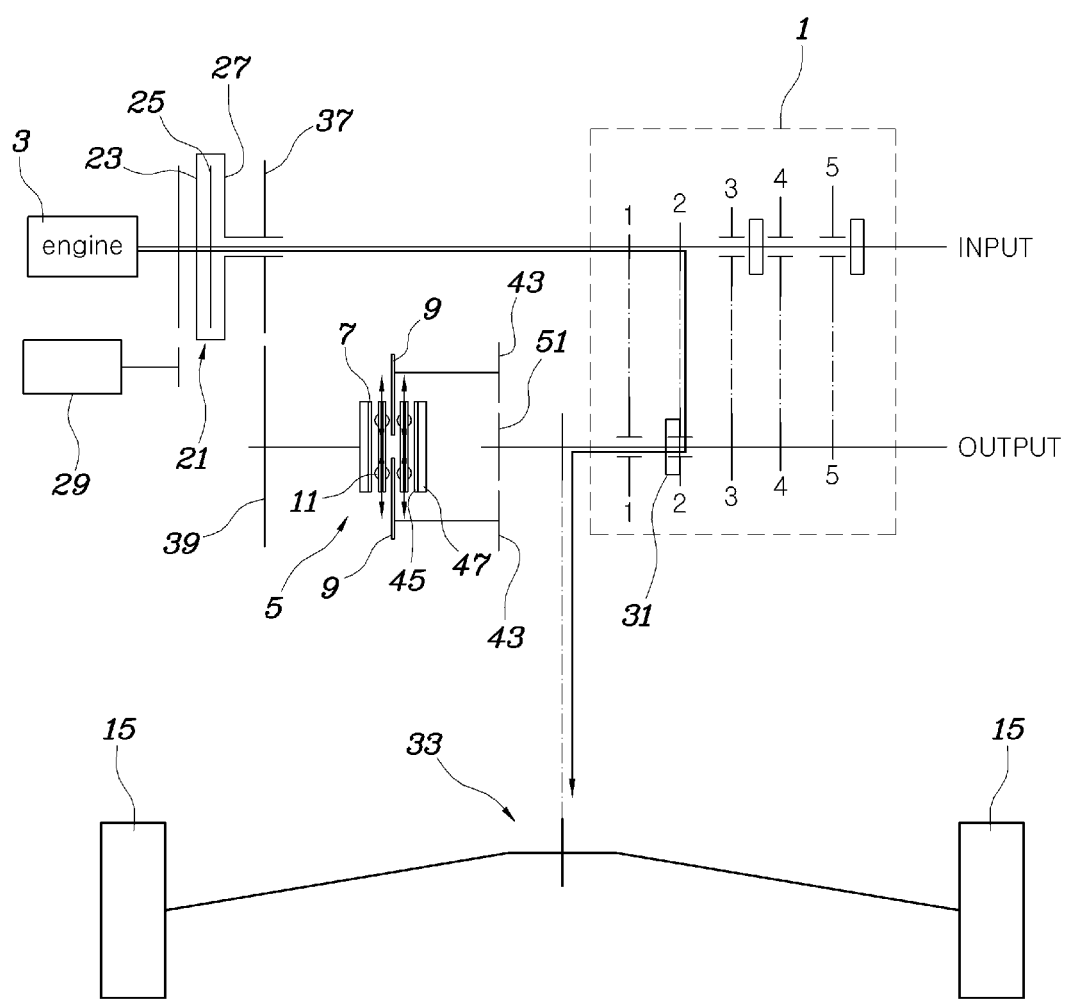
FIG. 8 is a view showing a power transference relation when a vehicle drives at a second stage in the structure shown in FIG. 1.
Figure 9:
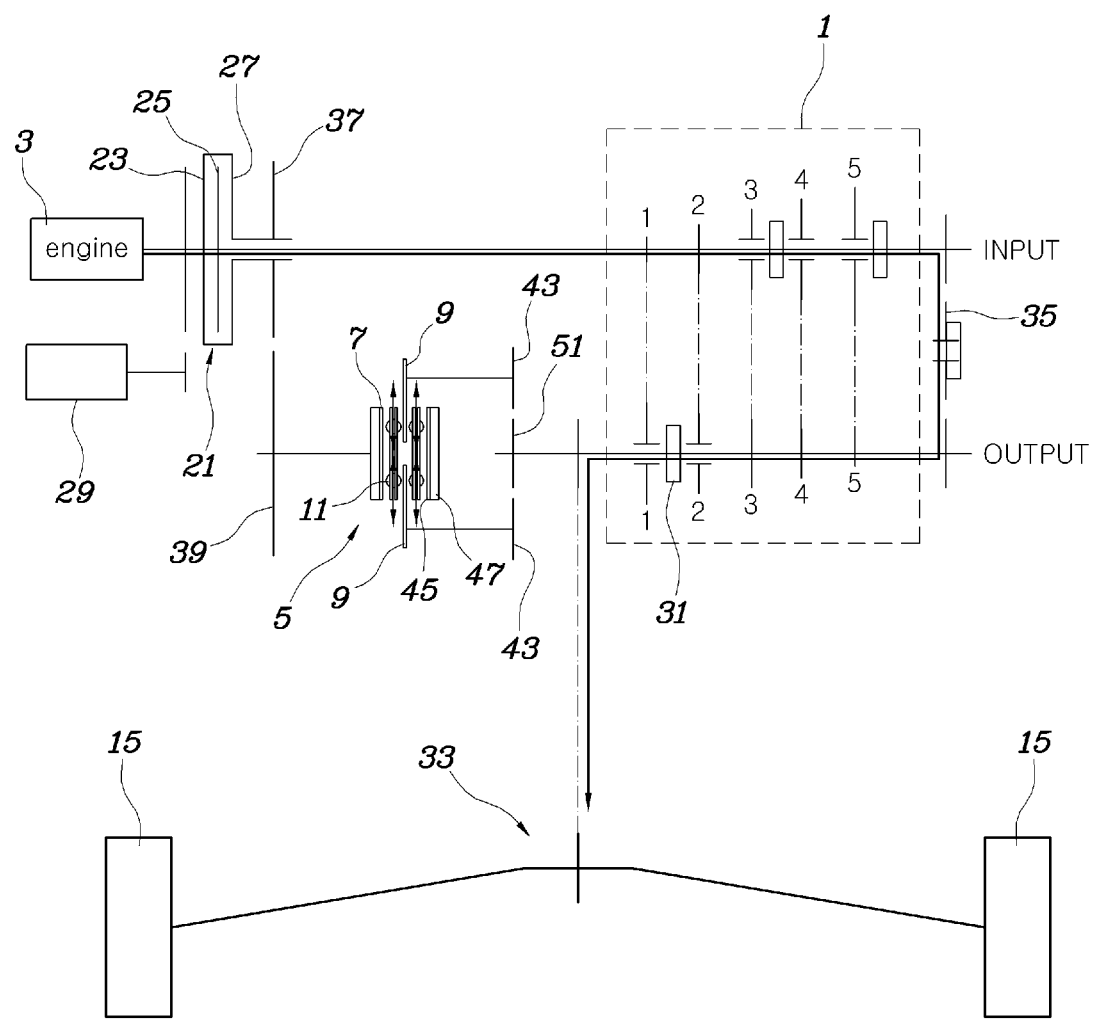
FIG. 9 is a view showing a power transference relation when a vehicle drives at an R stage in the structure shown in FIG. 1.

In the exemplary embodiments as shown in FIGS. 1 to 9, the shifting section 1 is configured by the shifting mechanism of the synchro-mesh type and the shifting section 1 is exemplary provided with a first to a fifth stages and R stage wherein R stage of a rear driving is illustrated only in FIG. 9 and a rear driving idler gear 35, which is omitted in FIGS. 1 to 8, is further illustrated.

Figure 5:
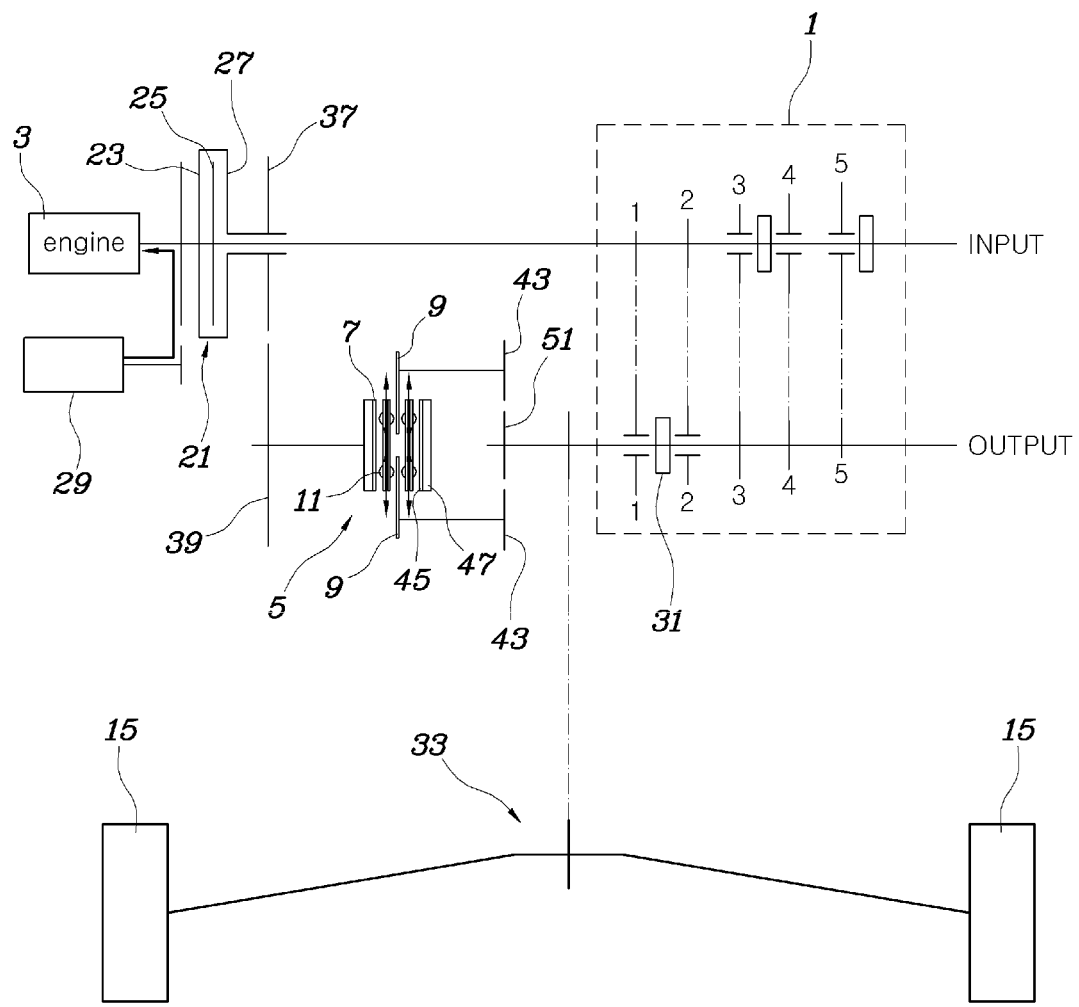
FIG. 5 is a view showing a power transference relation when an engine starts in the structure shown in FIG. 1.

FIG. 5 shows an engine starting state wherein the engine is cranked by a starting motor 29 and is started while the clutch 21 and the continuously variable power transfer device 5 are all cut. Accordingly, a rotation force of the engine is transferred only to the driving gear 37 and the driven gear 39 while power is not transferred to the input shaft and the output shaft.

Of course, the engine may start while the clutch is connected if the shifting section 1 does not connect any shifting stages when the engine is started.

Figure 6:
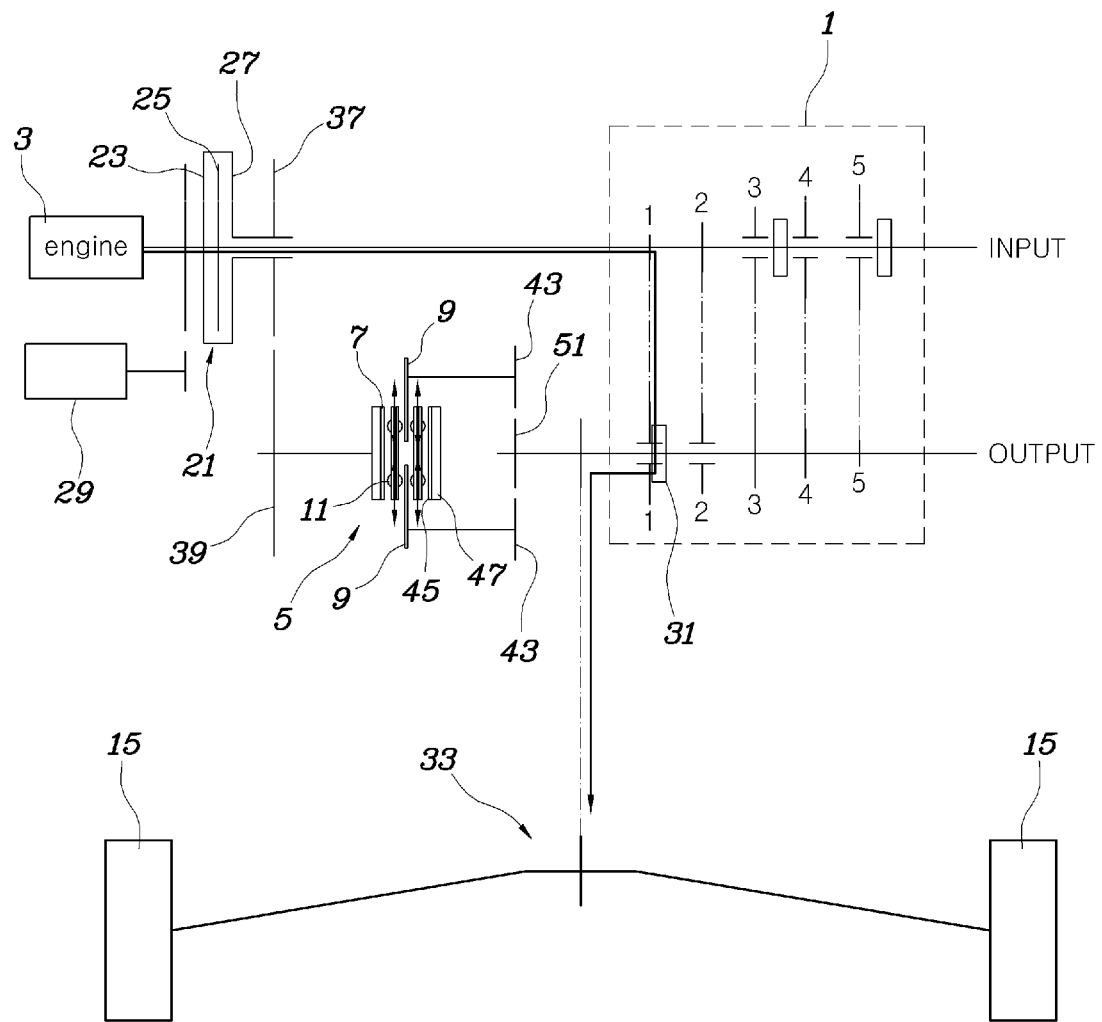
FIG. 6 is a view showing a power transference relation when a vehicle drives at a first stage in the structure shown in FIG. 1.

In the above-described state, when the clutch 21 is cut, the first stage shifting gears may be configured by a first-second stage synchro-mesh device 31, and when the clutch 21 is connected while the first stage shifting gears are formed, a vehicle accelerates and drives at a first stage as shown in FIG. 6.

In FIG. 6, power from an engine is transferred to the input shaft through the clutch 21 and then transferred to the output shaft while it is shifted to a first stage through a first shifting gear pair, and provided to a driving wheel through a differential 33.

At this time, the driving side cylinder 41 and the support side cylinder 47 are retreated to each other and thus the continuously variable power transfer device 5 is kept in a power blocking state and the power through the driving gear 37 and the driven gear 39 is not transferred to the output shaft.

FIG. 7 shows an intermediate course of shifting from a first stage to a second stage wherein the driving member 11 is in contact in a compressing state between the driving circular plate 7 and the driven circular plate 9 by operating the driving side cylinder 41 and the support side cylinder 47 while the clutch 21 is cut, and thus power from an engine is transferred to the output shaft through the driving circular plate 7, the driving member 11 and the driven circular plate 9 while the power from the engine is blocked to the input shaft, thereby preventing toque decrease during a shifting.

At this time, a gear ratio formed together with the driving circular plate 7, the driven circular plate 9 and the driving member 11 is adjusted from a state in which the driven circular plate 9 corresponds to a rotation speed of the output shaft in a first stage to a state in which the driven circular plate 9 corresponds to a rotation speed of the output shaft in a second stage wherein the contact points of the driving member 11 with the driving circular plate 7 and the driven circular plate 9 are varied by driving the driving member adjustment device 13 to form continuously a desired gear ratio, thereby preventing the torque decrease caused from blocking the torque being transferred to the input shaft by the clutch 21 during a shifting from a first stage to a second stage, and being capable of connecting smoothly a current stage and a target-stage.

As described above, the first-second stage synchro-mesh device 31 releases a first stage and completes the mesh to a second stage while the clutch 21 is cut and the continuously variable power transfer unit 5 is connected and thus power from the engine is supplied in a roundabout way to the output shaft through the driving circular plate 7, the driving member 11 and the driven circular plate 9.

After the second stage shifting gears are meshed, the continuously variable power transfer unit 5 is cut by retreating the driving side cylinder 41 and the support side cylinder 47 while connecting the clutch 21 and then a second stage driving is implemented, as shown in FIG. 8.

In FIG. 8, the power from an engine is adjusted to a second stage shifting between the input shaft and the output shaft through the clutch 21 and is supplied to a driving wheel through the differential 33 while the power that is transferred from the engine to the driven gear 39 is blocked by the continuously variable power transfer unit 5.

The continuous power supply to the output shaft by the driving circular plate 7, the driving member 11 and the driven circular plate 9 during a shifting of a first stage to a second stage is performed in the same way as other stages. Specially, even in case of high shifting stages such as a fourth and fifth stage, even overdrive shifting stage, in addition to a shifting between a first stage and a second stage, the power is compensated while a rotation speed of the output shaft of current shifting stage and a target shifting stage between the driving circular plate 7 and the driven circular plate 9 is varied continuously, thereby preventing the torque decrease and providing stable and smooth shifting feeling within an entire shifting range of the transmission.

Meanwhile, FIG. 9 shows a power transference situation while a vehicle is rear-driven wherein the rear driving idler gear 35 between the input shaft and the output shaft is connected while a vehicle is stopped, thereby implementing a rear driving shifting stage.

According to an exemplary embodiment of the present invention, an automated manual transmission is provided that can improve the commercial value of a vehicle by preventing non-smooth shifting to achieve smooth and stable shifting response, by transferring a separate power to a driving wheel during a shifting while using a conventional shifting mechanism in which power is blocked instantaneously necessarily and connected.

For convenience in explanation and accurate definition in the appended claims, the terms "upper", "lower", "inner" and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. An automated manual transmission for a vehicle comprising:
   a shifting section provided with a plurality of shifting units for implementing different gear ratio between an input shaft and an output shaft; and
   a continuously variable power transfer unit for transferring a power from a power providing device to the output shaft at a continuously variable gear ratio, wherein the continuously variable power transfer unit is disposed between the output shaft and the power providing device,
   wherein the continuously variable power transfer unit includes;
      a driving circular plate that is engaged to the power providing device;
      a driven circular plate that is engaged to the output shaft of the shifting section and is arranged in parallel to the driving circular plate, the driven circular plate being rotatable around a first rotation shaft spaced in parallel from a second rotation shaft of the driving circular plate;
      a driving member disposed between the driven circular plate and the driving circular plate and arranged such that a contact radius of the driving member with the driving circular plate and a contact radius of the driving member with the driven circular plate are increased-decreased mutually simultaneously by a movement thereof along a common radial direction of the driving circular plate and the driven circular plate; and
      a driving member adjustment device selectively moving the driving member, wherein the driving member includes:
      a reference control plate having a radial guide groove, wherein the radial guide groove is formed from a rotation center of the reference control plate in a radial direction thereof so that the driving member is inserted in the radial guide groove for a radial movement of the driving member to be guided therealong, and
      an inclination control plate having an inclination guide groove, wherein the inclination control plate is formed to be slanted with respect to a radial direction from a rotation center of the inclination control plate,
      wherein the reference control plate and the inclination control plate are coaxially arranged at the rotation centers of the reference control plate and the inclination control plate with the driving circular plate to be rotated relatively, and
      wherein the driving member is inserted in the radial guide groove and the inclination guide groove for a movement thereof to be guided.

2. The automated manual transmission for the vehicle of claim 1, further including:
   a driving side cylinder being connected to the driving circular plate and compressing the driving circular plate toward the driving member or separating the driving circular plate from the driving member; and
   a transfer gear being connected integrally to the driven circular plate through the first rotation shaft and transferring a rotation force of the driven circular plate to the output shaft.

3. The automated manual transmission for the vehicle of claim 2, further including:
   a support circular plate arranged rotatably and coaxially with the driving circular plate, in opposite direction to the driving circular plate with respect to the driven circular plate, wherein the driving member is arranged between the support circular plate and the driven circular plate such that a contact radius of the driving member with the support circular plate and a contact radius of the driving member with the driven circular plate are increased-decreased mutually and simultaneously by a movement thereof along a common radial direction of the support circular plate and the driven circular plate; and
   a support side cylinder being connected to the support circular plate and compressing the support circular plate toward the driving member or separating the support circular plate from the driving member.

4. The automated manual transmission for the vehicle of claim 3,
   wherein the driving circular plate is coaxially connected via the second rotation axis to the driven gear that is meshed with a driving gear connected to a third rotation shaft of the power providing device,
   wherein a plurality of driven circular plates are arranged with respect to the driving circular plate, and
   wherein a plurality of transferring gears are connected to each of the driven circular plates respectively and are together meshed with an output driven gear of the output shaft.

5. The automated manual transmission for the vehicle of claim 4,
wherein driving member adjustment devices are arranged doubly in parallel with each other between the driving circular plate and the driven circular plate.

6. The automated manual transmission for the vehicle of claim 3,
wherein a plurality of driving circular plates are provided respectively with a media gear engaged with the driven gear,
wherein the driven circular plate is provided commonly to the driving circular plates, and
wherein the transferring gear connected to the driven circular plate is meshed with an output driven gear of the output shaft.

7. The automated manual transmission for the vehicle of claim 1, wherein a clutch for providing intermittently power from the power providing device to the input shaft is provided between the input shaft and the power providing device.

8. The automated manual transmission for the vehicle of claim 1, wherein a shifting mechanism of the shifting section is synchronized and meshed by using a key and a synchronizer.

9. The automated manual transmission for the vehicle of claim 1, wherein a shifting mechanism of the shifting section is configured by a dog clutch.

10. An automated manual transmission for a vehicle comprising:
a shifting section provided with a plurality of shifting units for implementing different gear ratio between an input shaft and an output shaft; and
a continuously variable power transfer unit for transferring a power from a power providing device to the output shaft at a continuously variable gear ratio, wherein the continuously variable power transfer unit is disposed between the output shaft and the power providing device
wherein the continuously variable power transfer unit includes;
a driving circular plate that is engaged to the power providing device;
a driven circular plate that is engaged to the output shaft of the shifting section and is arranged in parallel to the driving circular plate, the driven circular plate being rotatable around a first rotation shaft spaced in parallel from a second rotation shaft of the driving circular plate;
a driving member in the form of a roller disposed between the driven circular plate and the driving circular plate and arranged such that a contact radius of the driving member with the driving circular plate and a contact radius of the driving member with the driven circular plate are increased-decreased mutually simultaneously by a movement thereof along a common radial direction of the driving circular plate and the driven circular plate; and
a driving member adjustment device selectively moving the driving member,
wherein a clutch for providing intermittently power from the power providing device to the input shaft is provided between the input shaft and the power providing device,
wherein the power providing device is an engine of an internal combustion engine,
wherein the clutch includes a clutch disk that is configured to be in contact with a fly wheel of the engine, and
wherein the driving circular plate is connected to a clutch cover which surrounds an outer part of the clutch disk,
the driving circular plate being driven by a hollow shaft through which the input shaft passes, and receives power therefrom.

11. An automated manual transmission for a vehicle comprising:
a shifting section provided with a plurality of shifting units for implementing different gear ratio between an input shaft and an output shaft; and
a continuously variable power transfer unit for transferring a power from a power providing device to the output shaft at a continuously variable gear ratio, wherein the continuously variable power transfer unit is disposed between the output shaft and the power providing device,
wherein the continuously variable power transfer unit includes:
a driving circular plate that is engaged to the power providing device;
a driven circular plate that is arranged in parallel to the driving circular plate, the driven circular plate being rotatable around a first rotation shaft spaced in parallel from a second rotation shaft of the driving circular plate;
a support circular plate that is arranged coaxially with the driving circular plate and the output shaft and is connected to the output shaft;
a driving member disposed between the driven circular plate and the driving circular plate and arranged such that a contact radius thereof with the driving circular plate and a contact radius thereof with the driven circular plate are increased-decreased mutually simultaneously by a movement thereof along a common radial direction of the driving circular plate and the driven circular plate;
a driving member adjustment device selectively moving the driving member; and
a support side cylinder being connected to the support circular plate and compressing the support circular plate toward the driving member or separating the support circular plate from the driving member, and
wherein the driving member adjustment devices includes:
a reference control plate having a radial guide groove, wherein the radial guide groove is formed from a rotation center of the reference control plate in a radial direction thereof so that the driving member is inserted in the radial guide groove for a radial movement of the driving member to be guided therealong; and
an inclination control plate having an inclination guide groove, wherein the inclination control plate is formed to be slanted with respect to a radial direction from a rotation center of the inclination control plate,
wherein the reference control plate and the inclination control plate are coaxially arranged at the rotation centers of the reference control plate and the inclination control plate with the driving circular plate to be rotated relatively, and
wherein the driving member is inserted in the radial guide groove and the inclination guide groove for a movement thereof to be guided.

12. The automated manual transmission for the vehicle of claim 11, wherein driving member adjustment devices are arranged doubly in parallel with each other between the driving circular plate and the driven circular plate.

* * * * *